United States Patent
Lee et al.

(10) Patent No.: US 8,027,459 B2
(45) Date of Patent: Sep. 27, 2011

(54) SYSTEM AND METHOD FOR PROVIDING QUEUE TIME CREDIT FOR SELF-SERVICING CALLERS

(75) Inventors: Johnny Lee, Mountain View, CA (US); Fadi R. Jabbour, Sunnyvale, CA (US); David C. Lee, Sunnyvale, CA (US)

(73) Assignee: Cisco Systems, Inc., San Jose, CA (US)

( * ) Notice: Subject to any disclaimer, the term of this patent is extended or adjusted under 35 U.S.C. 154(b) by 1192 days.

(21) Appl. No.: 11/129,983

(22) Filed: May 16, 2005

(65) Prior Publication Data
US 2006/0256956 A1    Nov. 16, 2006

(51) Int. Cl.
*H04M 3/00* (2006.01)
*H04M 5/00* (2006.01)

(52) U.S. Cl. .......... 379/266.01; 379/266.03; 379/266.06

(58) Field of Classification Search ............. 379/266.01, 379/265.13, 266.06, 266.03, 265.11, 266.02
See application file for complete search history.

(56) References Cited

U.S. PATENT DOCUMENTS

| | | | |
|---|---|---|---|
| 4,472,833 A | 9/1984 | Turrell et al. | |
| 5,249,223 A | 9/1993 | Vanacore | |
| 5,493,608 A | 2/1996 | O'Sullivan | |
| 5,509,064 A | 4/1996 | Welner | |
| 5,537,470 A | 7/1996 | Lee | |
| 5,866,890 A | 2/1999 | Neuner | |
| 6,059,184 A | 5/2000 | Ahlstrom et al. | |
| 6,137,862 A | 10/2000 | Atkinson et al. | |
| 6,160,877 A | 12/2000 | Tatchell et al. | |
| 6,259,786 B1 * | 7/2001 | Gisby ...................... | 379/266.01 |
| 6,263,066 B1 * | 7/2001 | Shtivelman et al. ..... | 379/266.06 |
| 6,333,980 B1 | 12/2001 | Hollatz et al. | |
| 6,546,082 B1 | 4/2003 | Alcendor et al. | |
| 6,567,848 B1 | 5/2003 | Kusuda et al. | |
| 6,587,545 B1 | 7/2003 | Antonucci et al. | |
| 6,654,458 B1 | 11/2003 | Saleh | |

(Continued)

FOREIGN PATENT DOCUMENTS

AU    8521798    4/1999

(Continued)

OTHER PUBLICATIONS

Nigel Ward and Satoshi Nakagawa, "Automatic user-adaptive speaking rate selection for information delivery", Jun. 25, 2002, (electronic copy, 4 pages), Mechano-Informatics, S.

(Continued)

*Primary Examiner* — Thjuan K Addy
(74) *Attorney, Agent, or Firm* — The Law Offices of Bradley J. Bereznak

(57) ABSTRACT

A system and method for servicing a caller at a contact center includes providing self-service menu options to the caller through an automated system, and determining a total time spent by the caller in the automated system. If the caller's attempts at self-service are unsuccessful, the caller is transferred out of the automated system and into a position of a wait queue, the position of the caller in the wait queue being determined based on a credit for the total time spent by the caller in the automated system. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

17 Claims, 2 Drawing Sheets

U.S. PATENT DOCUMENTS

| | | | |
|---|---|---|---|
| 6,675,216 | B1 | 1/2004 | Quatrano et al. |
| 6,687,877 | B1 | 2/2004 | Sastry et al. |
| 6,697,457 | B2 | 2/2004 | Petrushin |
| 6,798,768 | B1 | 9/2004 | Gallick et al. |
| 6,826,194 | B1 | 11/2004 | Vered et al. |
| 7,249,025 | B2 | 11/2004 | Junqua et al. |
| 6,845,361 | B1 | 1/2005 | Dowling |
| 6,847,715 | B1 | 1/2005 | Swartz |
| 6,859,776 | B1 | 2/2005 | Cohen et al. |
| 6,879,586 | B2 | 4/2005 | Miloslavky et al. |
| 6,882,641 | B1 | 4/2005 | Gallick et al. |
| 6,940,963 | B2 | 9/2005 | Stumer et al. |
| 7,436,948 | B1 * | 10/2008 | Thenthiruperai ........ 379/266.03 |
| 2002/0090076 | A1 | 7/2002 | Uppaluru et al. |
| 2002/0196928 | A1 | 12/2002 | Johnson et al. |
| 2003/0002650 | A1 | 1/2003 | Gruchala et al. |
| 2004/0109555 | A1 | 6/2004 | Williams |
| 2005/0002516 | A1 | 1/2005 | Shtivelman |
| 2005/0059463 | A1 | 4/2005 | Gilmore et al. |
| 2005/0069102 | A1 | 4/2005 | Chang |
| 2005/0089053 | A1 | 4/2005 | Zhu |
| 2005/0163302 | A1 | 7/2005 | Mock et al. |
| 2005/0175167 | A1 * | 8/2005 | Yacoub et al. ........... 379/265.13 |
| 2005/0286705 | A1 | 12/2005 | Contolini et al. |
| 2006/0030290 | A1 | 2/2006 | Rudolf |
| 2007/0127691 | A1 | 6/2007 | Lert, Jr. |

FOREIGN PATENT DOCUMENTS

| | | |
|---|---|---|
| EP | 1 030 504 A2 | 8/2000 |

OTHER PUBLICATIONS

Jing Zheng, Horacio Franco, and Andreas Stolcke, "Rate of Speech Modeling for Large Vocabulary Conversation Speech Recognition", May 18, 2001, (electronic copy, 5 pages), Spe.

L.Melscoet, "Alcatel CCweb: Marriage of the Internet with the call center", Electrical communication, Alcatel, Brussels, BE, No. 1, 2000, (electronic copy, 5 pages).

D.Steul, "Redefining the call center: Customer service on the Internet", Alcatel telecommunications Review, Alcatel, Paris Cedex, FR, Mar. 2000, (electronic copy, 6 pages).

Cisco Systems, Inc., Cisco Enterprise Class Teleworker Solution, (electronic copy, 10 pages), Submitted on Aug. 9, 2007.

* cited by examiner

SYSTEM AND METHOD FOR PROVIDING QUEUE TIME CREDIT FOR SELF-SERVICING CALLERS

FIELD OF THE INVENTION

The present invention relates generally to the field of automatic call distributors; more specifically, to systems and methods for providing services to a particular class or category of caller.

BACKGROUND OF THE INVENTION

Interactive voice response (IVR) systems that provide information and channel calls to service agents in response to the spoken words or touch tone signaling of a telephone caller have been deployed for more than a decade. The traditional call center for handling service calls was based on a private branch exchange (PBX) that included core automatic call distributor (ACD) functions for connecting a caller to one of a plurality of agents. During the 1990s, the advent of the Internet, electronic commerce, and computer telephony integration (CTI) transformed the call center in ways that enabled delivery of caller data to agents, thereby enabling agents to become more efficient and to improve customer service levels. Today, many enterprises use multiple call or contact centers (both terms are used synonymously and interchangeably in the present application) that extend across different geographic regions, with communications taking place through public switched telephone networks (PSTNs) and Internet protocol (IP) enabled networks that support multi-channel (voice, e-mail, text chat, and Web collaboration) customer interaction.

By way of example, U.S. Pat. No. 6,798,877 teaches a system in which a caller utilizes a personal computer (PC) for establishing an Internet connection to an ACD and for permitting a caller to select a particular agent. A system for providing information about a telephone caller to a telephone agent, wherein caller-specific data of the caller is used to generate a web page that displays the identified information to the agent is taught in U.S. Pat. No. 6,871,212. U.S. Pat. No. 6,847,715 discloses a system for operatively integrating an ACD and an IVR unit in which an interaction input from a caller is stored and then transmitted to an appropriate agent workstation. The session initiation protocol (SIP) is a widely accepted standard for Internet conferencing, telephony, presence, events notification and instant messaging, which incorporates the notion of caller preferences for certain types of interactive communication sessions (e.g., designating a certain genre of music when on hold during a call). A method and apparatus for analyzing the performance of an IVR system with respect to routing of calls or contacts received in accordance with a contact flow model is described in U.S. Pat. No. 6,879,685.

Call center systems often include telephony scripts that are designed in a manner that allows calling customers (callers) to navigate an IVR menu in order to perform self-services prior to connecting to a live call center agent. A caller who finds the IVR insufficient to service their needs typically ends up waiting in a queue for the next available agent. One problem with this type of system, however, is that callers who are unsuccessful in performing self-service through the IVR are placed in the last position of the agent wait queue. In other words, calling customers who attempt self-service may have to endure a wait time in queue that is just as long (or longer) than a caller who skips the IVR menu and proceeds directly to the agent wait queue. Thus, callers are not rewarded for trying to solve their problems through self-service and therefore have less incentive to use the automated features of the IVR system. Indeed, this problem provides callers with more incentive to bypass the IVR system entirely and go straight into the queue to wait to speak with a live call center agent.

One prior approach that attempts to reduce a caller's eventual wait time involves placing every caller in every queue the moment that the call arrives. However, a serious drawback with this solution is that it skews important statistics tracked by call centers since not every caller needs to speak with an agent and be placed in all of the ACD queues. This extra queuing also wastes call center resources required for this function. An additional disadvantage of this approach is that it normally operates to transfer a caller at the bottom of a queue as soon as an agent becomes available. But such a transfer may be undesirable because it could result in interrupting a caller who is attempting self-service through the IVR system.

Therefore, what is a needed is an improved call center system and method of operation that rewards callers who attempt self-service through an IVR or other automated system, yet who still eventually need assistance from a live call center agent.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A system that provides queue time credit for self-servicing callers is described. In the following description specific details are set forth in order to provide a thorough understanding of the present invention. However, persons having ordinary skill in the arts will appreciate that these specific details may not be needed to practice the present invention.

According to one embodiment of the present invention, a "queued-navigation" state is introduced in an ACD system that provides automated self-services for callers to a call center session. These self-services, for instance, may be provided through a touch-tone or voice-activated IVR system, or, alternatively, through some other automated interactive user interface (i.e., a computer transmitted graphical user interface). When a call arrives at a call center, the caller is immediately placed in the queued-navigation state and the caller is allowed to attempt to satisfy his needs through the self-service functions provided by the ACD. The ACD tracks the amount of time that the caller spends navigating through the self-service system. During this time, the call center system does not treat the caller as being in queue so that his call statistics do not count towards any of the queue statistics normally generated by the call center.

In the event that the caller's needs are satisfied by the self-service menu of the automated (e.g., IVR) system and he hangs up without needing agent assistance, the call is simply treated as a normal IVR call session. On the other hand, if the caller is unsuccessful in his attempt at self-service through the IVR and needs to speak with an agent, the caller transitions from the queued-navigation state to a normal queued state. The caller is placed in a position in the wait queue relative to other callers based on the amount of time the caller spent in the queued-navigation state. That is, the caller is credited with the time spent navigating through the automated interactive system. In this manner, the time-credited caller may be placed in queue ahead of later callers who spent less time in the queued-navigation state, or who simply elected to bypass the IVR system entirely.

In one embodiment, the time that a caller spends in the queued-navigation state is counted towards the wait-time statistics of the particular queue into which the caller is placed. In addition, the call center may correlate the caller's time spent in the queued-navigation state to the amount of time that the caller spends actually talking with one or more agents. Such a correlation may be useful, for example, in determining the effectiveness of the specific interactive menus used to provide automated services.

Figure 1:
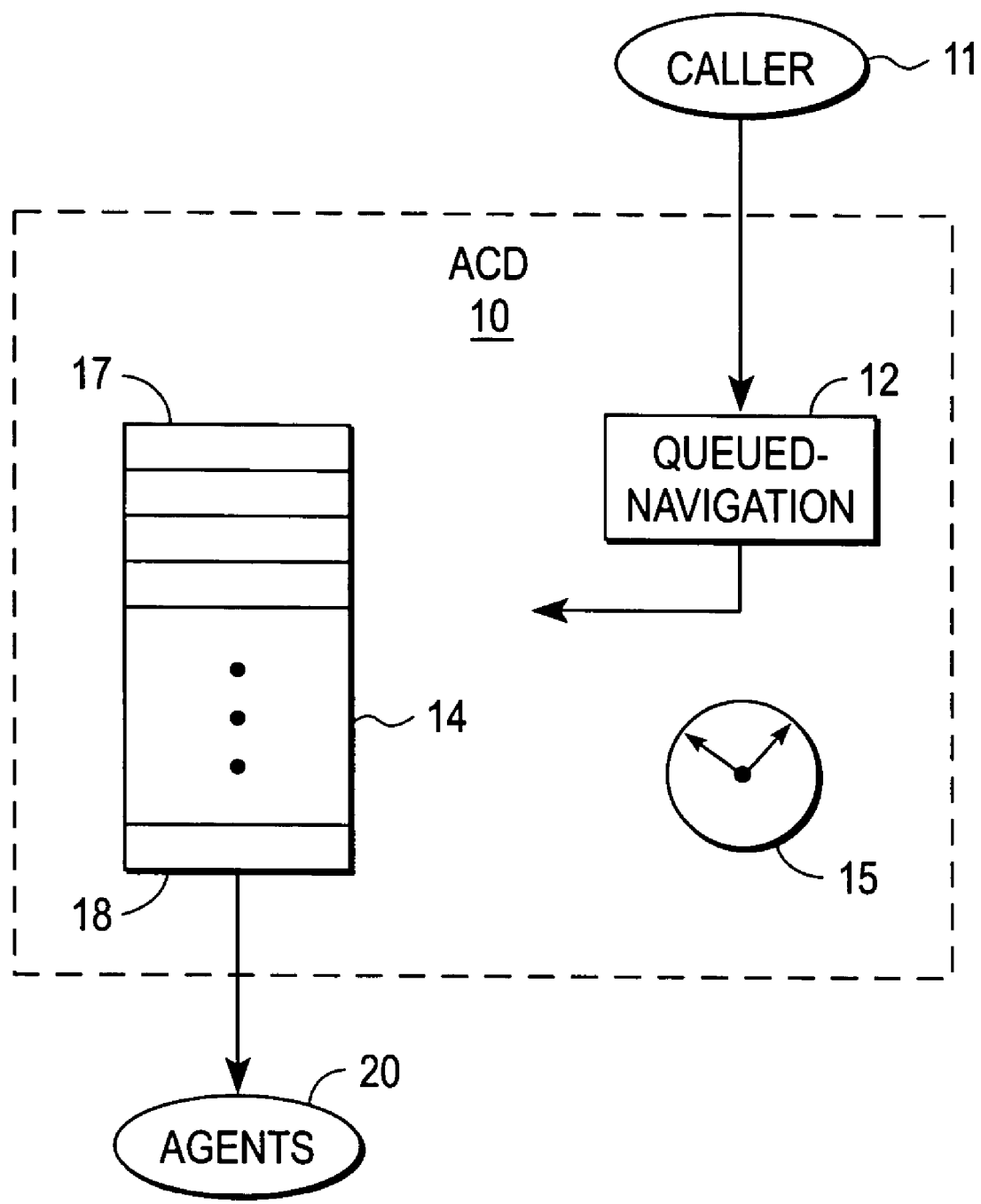
FIG. 1 is a diagram of an automatic call distributor (ACD) system in accordance with one embodiment of the present invention.

FIG. 1 is a diagram of a system in accordance with one embodiment of the present invention, which system includes an ACD 10 configured to receive and service calls from a caller 11. ACD 10 is also shown including one or more electronic timers 15 and a queue 14 where callers wait for service from one of a plurality of agents 20. Wait queue 14 has a top (i.e., last) slot or position 17, and a bottom (i.e., first) position 18. The priority status of callers in wait queue 14 incrementally varies from the bottom position 18, which has the highest priority and thus the shortest wait, to the top position 17, which has the lowest priority and the longest wait among callers in queue 14. A caller at position 18 in queue 14 gets transferred to the next available agent of the plurality of agents 20 connected to ACD 10.

The diagram of FIG. 1 also conceptually illustrates the concept of a queued-navigation state (shown as block 12) that caller 11 enters as soon his call is received at ACD 10 in accordance with the present invention. In one implementation, the caller is initially provided with an IVR telephony script or a navigation menu that gives the caller the opportunity to try to resolve their particular issue or need through self-service. The IVR system may also be useful in soliciting information about the caller and/or his problem that can be used later by a live agent to provide more efficient service. This information may include the caller's name, account number, password, reason for the call, etc. The IVR system is typically embodied in one or more software or firmware modules with code that executes on one or more processors of ACD 10.

At the same time that caller 11 enters queued-navigation state 12, one or more of timers 15 starts running to track the time that caller spends in the automated self-service (e.g., IVR) system, i.e., the length of time that the caller spends in queued-navigation state 12. Caller 11 may be transferred from queued-navigation state 12 to a queued state in wait queue 14 in a variety of ways. For example, caller 11 may chose to talk with an agent through an IVR menu option selection. Alternatively, navigation through the IVR system may result in the system determining that the nature of the caller's problem dictates transfer to an agent. Another possibility is that the IVR system is configured to transfer a caller to an agent anytime it fails to recognize a response or command input to the system by the caller.

Regardless of the transfer mechanism employed, a caller entering wait queue 14 is first credited for time spent in queued-navigation state 12. In other words, when caller 11 leaves queued-navigation state 12, a processor of the ACD determines the time credit for caller 11, and then based on that time credit, the appropriate position caller 11 should be placed in wait queue 14 relative to other callers in queue who are waiting to speak with one of agents 20. That is, ACD 10 tracks the total amount of time each caller has spend in the call center system, which includes time spent in queue 14. A time-credited caller 11 is accorded a position in wait queue 14 that is behind callers who have spent more total time in the call center system, and ahead of callers who have spent less total time in the call center system.

Figure 2:
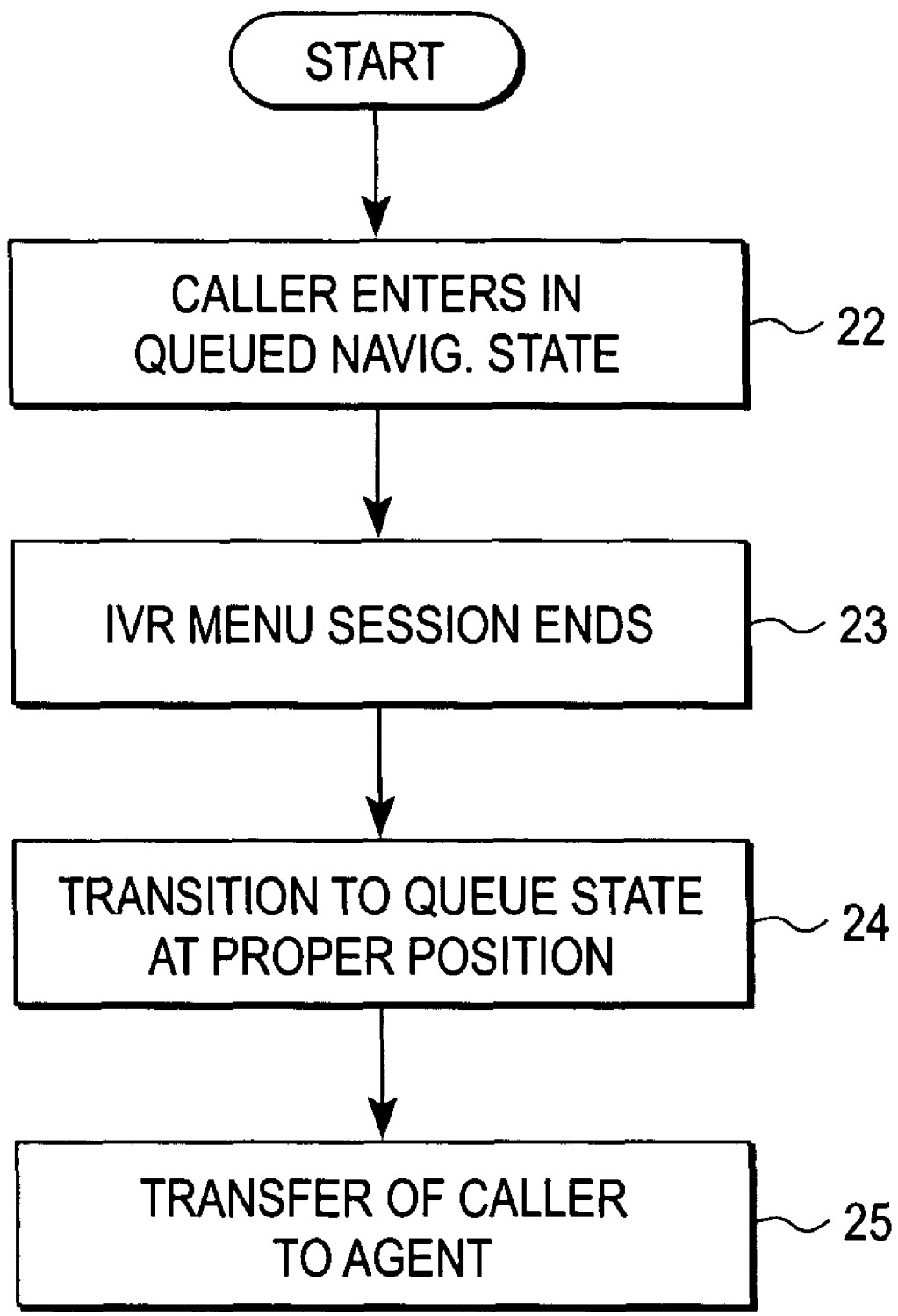
FIG. 2 is a flowchart diagram that illustrates a method of operation according to one embodiment of the present invention.

FIG. 2 is a flowchart diagram that illustrates a basic method of servicing a caller at a call center according to one embodiment of the present invention. When a call is received at the center the caller is immediately placed in the queued navigation state (block 22), wherein the caller utilizes the self-service features of the IVR menu. All the while, the ACD tracks the amount of time that the caller spends in the queued navigation state. When the IVR session ends (block 23) the caller transitions from the queued navigation state to the queue state. At this transition point, the caller is placed into queue to wait to speak with an agent at an appropriate position; that is, at a position that gives the caller credit for the total time spent in the IVR relative to other callers in the system (block 24). Over time, the caller moves down to the bottom of the queue (highest priority position) and is eventually transferred to an agent connected with the ACD (block 25).

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A processor-implemented method of servicing a caller at a call center comprising:

placing the caller in a navigation state immediately upon receiving a call from the caller, while in the navigation state the call center providing the caller with an automated interactive system with self-service menu options, the caller not being queued by the call center while the caller is in the navigation state; and transferring the caller from the navigation state to a queued state in the event that the caller is unsuccessful at self-service through the automated interactive system, the transitioning occurring during the call, without disconnecting the call, in the queue state the caller being placed in a wait queue to wait for connection with an agent, the caller being placed at a position in the wait queue relative to other callers in the wait queue based on a credit for a total time spent by the caller in the automated interactive system, the position in the wait queue being ahead of one or more other callers, each of whom spent less time in the automated interactive system than the caller.

2. The processor-implemented method of claim 1 wherein the self-service menu options includes an option selectable to the caller for talking with an agent.

3. The processor-implemented method of claim 1 wherein the position of the caller in the wait queue is behind an earlier caller who has waited longer than the credit for time spent by the caller.

4. The processor-implemented method of claim 1 wherein the automated interactive system comprises an interactive voice response (IVR) system.

5. A method of operation at a call center comprising:
receiving a call from a caller;
placing the caller in a navigation state that provides self-service menu options to the caller through an automated interactive system, the caller not being queued while the caller is in the navigation state;
determining a total time spent by the caller navigating through the automated interactive system; and
transferring the caller out of the navigation state during the call, without disconnecting the call, and into a queued state wherein the caller is placed into a position of a wait queue, the position of the caller in the wait queue being determined based on a credit for the total time spent by the caller in the navigation state.

6. The method of claim 5 further comprising:
progressively moving the caller through the wait queue;
connecting the caller with an agent after the caller has progressed to a highest priority position in the wait queue.

7. The method of claim 5 wherein the position of the caller in the wait queue is behind an earlier caller who has waited longer, and ahead of a later caller who has waited less, than the total time spent by the caller.

8. The method of claim 5 wherein the automated interactive system comprises an interactive voice response (IVR) system.

9. An automatic call distributor (ACD) for servicing a call from a caller comprising:
an automated interactive system that provides self-service menu options to the caller upon receipt of the call, the caller not being queued when utilizing the self-service menu options;
a wait queue having a plurality of positions; and
means for determining a total time spent by the caller in the automated interactive system and for transferring the caller out of the automated interactive system and placing the caller into a position of the wait queue, the position of the caller in the wait queue being determined based on a credit for the total time spent by the caller in the automated interactive system, the caller being placed in the wait queue to wait to speak with an agent after the caller exits the automated interactive system without ending the call, the caller remaining in the wait queue during the call so long as the call is not disconnected and until such time that the caller progresses to a highest priority position in the wait queue and the agent is available.

10. The ACD of claim 9 wherein the means is further operable to connect the caller with the agent after the caller has progressed to the highest priority position in the wait queue.

11. The ACD of claim 9 wherein the position of the caller in the wait queue is ahead of a later caller who has waited less than the total time spent by the caller in the automated interactive system.

12. The ACD of claim 9 wherein the automated interactive system comprises an interactive voice response (IVR) system.

13. An automatic call distributor (ACD) for servicing a call from a caller comprising:
an automated interactive system that provides self-service menu options to the caller upon receipt of the call, the caller not being queued when utilizing the self-service menu options;
a wait queue having a plurality of positions; and
a processor to determine a total time spent by the caller in the automated interactive system and to transfer the caller out of the automated interactive system and placing the caller into a position of the wait queue, the position of the caller in the wait queue being determined based on a credit for the total time spent by the caller in the automated interactive system, the processor placing the caller in the wait queue to wait to speak with an agent after the caller is transferred out of the automated interactive system without ending the call, the caller remaining in the wait queue during the call so long as the call is not disconnected and until such time that the caller progresses to a highest priority position in the wait queue and the agent is available.

14. The ACD of claim 13 wherein the processor is further operable to connect the caller with the agent after the caller has progressed to the highest priority position in the wait queue.

15. The ACD of claim 13 wherein the position of the caller in the wait queue is behind an earlier caller who has waited longer, and ahead of a later caller who has waited less, than the total time spent by the caller in the automated interactive system.

16. The ACD of claim 13 wherein the automated interactive system comprises an interactive voice response (IVR) system.

17. The ACD of claim 13 wherein the automated interactive system comprises a computer transmitted graphical user interface.

* * * * *